Oct. 29, 1946.   G. WALLACH   2,410,137
POWER TRANSMISSION APPARATUS
Filed July 19, 1944   6 Sheets-Sheet 2

Inventor
GEORGE WALLACH,
By Clarence A. O'Brien
and Harvey B. Jackson
Attorneys

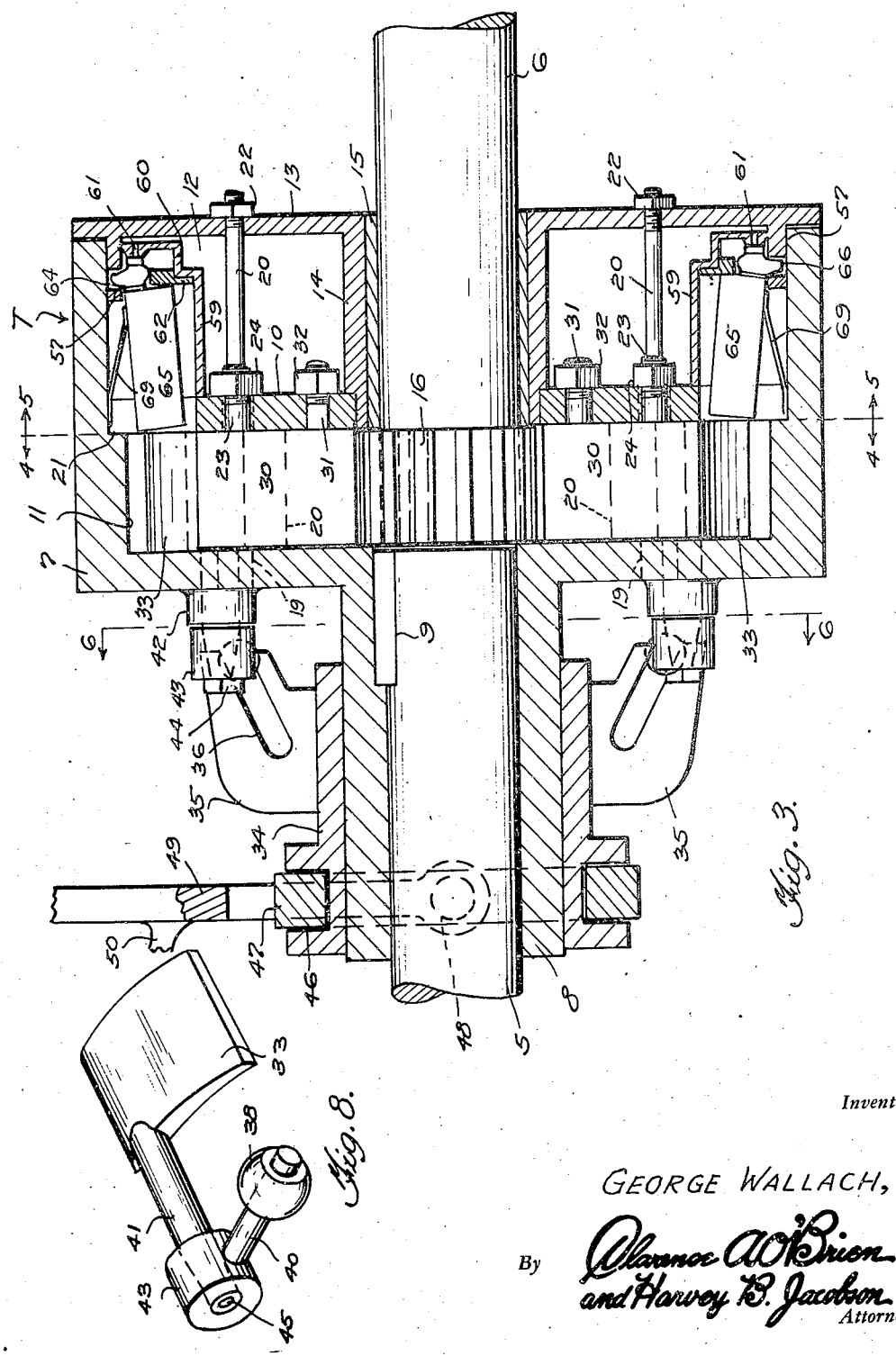

Oct. 29, 1946.  G. WALLACH  2,410,137
POWER TRANSMISSION APPARATUS
Filed July 19, 1944  6 Sheets-Sheet 4
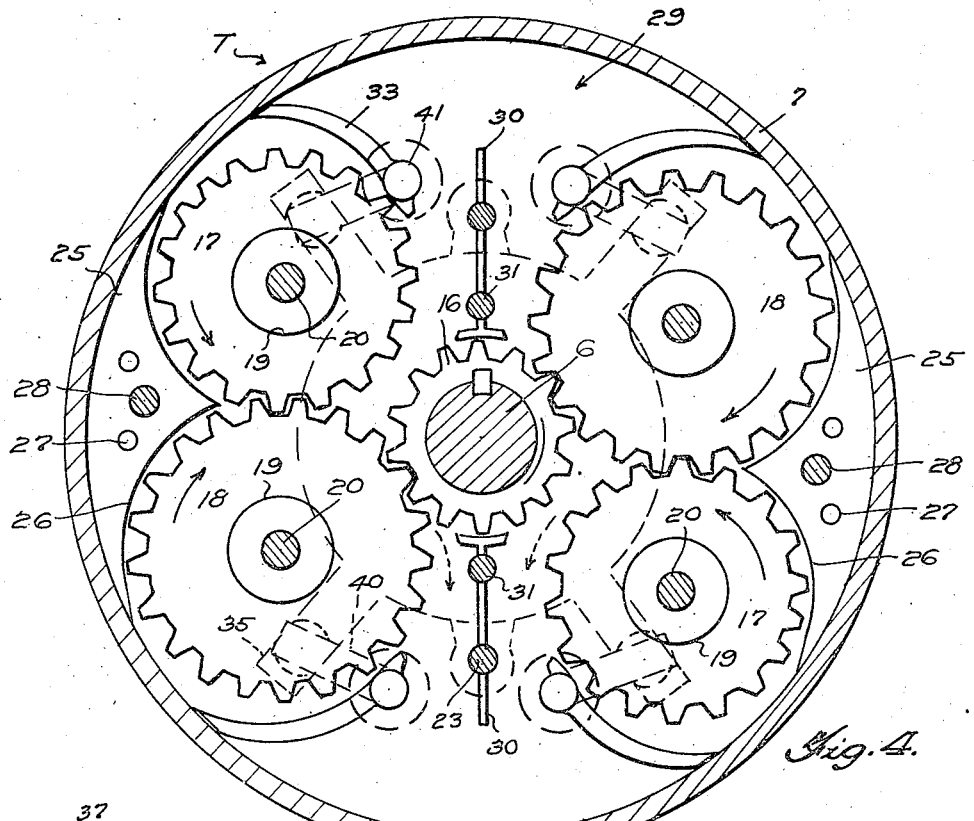
Fig. 4.
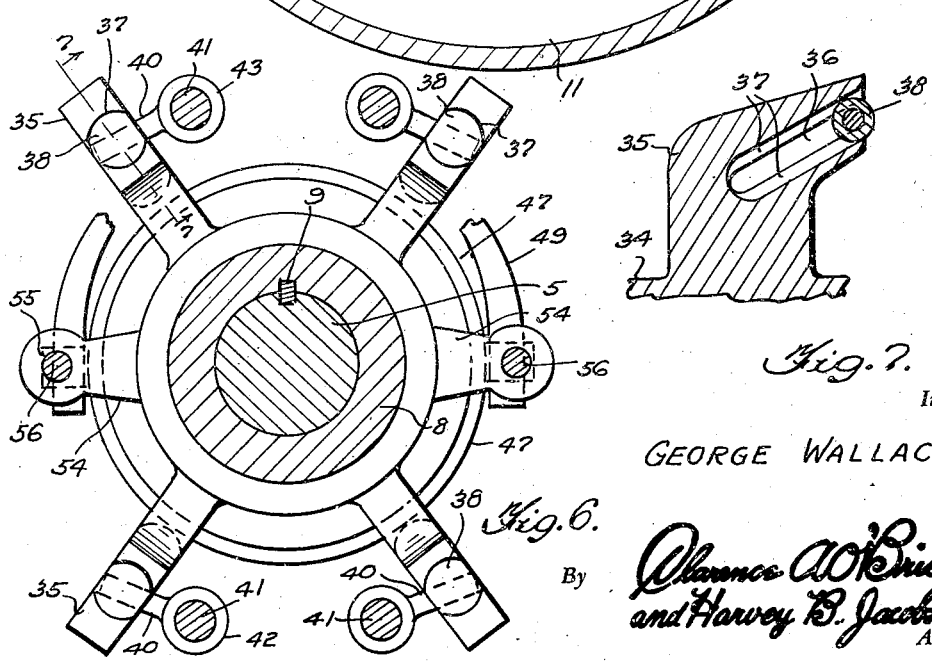
Fig. 6.
Fig. 7.
Inventor
GEORGE WALLACH,
By *Clarence A. O'Brien and Harvey B. Jackson*
Attorneys Oct. 29, 1946. G. WALLACH 2,410,137
POWER TRANSMISSION APPARATUS
Filed July 19, 1944  6 Sheets-Sheet 5

Inventor
GEORGE WALLACH,
By Clarence A. O'Brien
and Harvey B. Jacobson
Attorneys

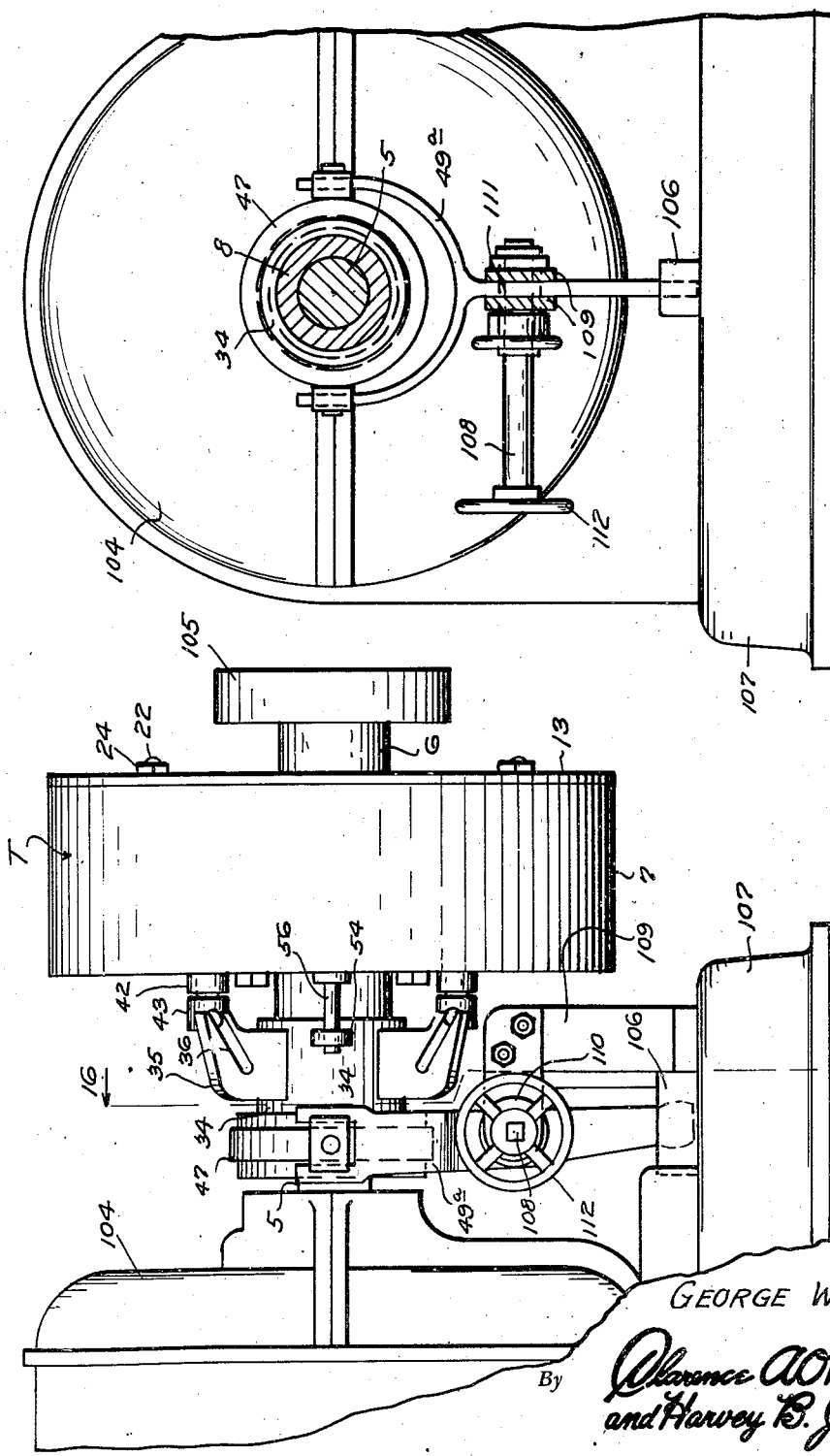

Patented Oct. 29, 1946

2,410,137

UNITED STATES PATENT OFFICE 2,410,137

POWER TRANSMISSION APPARATUS

George Wallach, Chapman Camp, British Columbia, Canada

Application July 19, 1944, Serial No. 545,693

6 Claims. (Cl. 192—61)

1

This invention relates generally to power transmission apparatus, and an important object of the present invention is to provide, in an apparatus of the above kind, an improved planetary type of variable speed hydraulic transmission.

Another important object of the present invention is to provide, in an apparatus of the above kind, a variable speed transmission for forward speeds, and an improved combined differential and reversing gearing for transmitting power from the driven shaft of the transmission to the rear aligned transverse axle sections of a motor vehicle, whereby reverse drive of the vehicle may be effectd in a simple manner and without incorporating the reverse drive in the transmission. This is particularly useful when a hydraulic transmission is employed, as in the present invention, permitting simplification of the transmission.

A more specific object of the present invention is to provide an improved hydraulic transmission of the above kind wherein the sun gear is fixed on the driven shaft, wherein a pair of gear pumps is provided in the transmission casing with one gear of each pump meshing with the sun gear and constituting a planet gear movable with the transmission casing in an orbital path about the sun gear, the pump gears being carried by axes parallel with the driven and driving shafts and fixed to the transmission casing, the transmission casing being fixed on the driving shaft, and manually operable means being provided for controlling the flow of oil to the gear pumps for varying the stalling action on or resistance to rotation of the pump gears. Thus, if the pump gears are allowed to rotate freely about their axes as they revolve with the transmission housing about the sun gear, no power is transmitted from the driving to the driven shaft. On the other hand, if resistance is offered to rotation of the pump gears by causing them to pump oil in circuits within the transmission housing, power will be transmitted from the driving shaft to the driven shaft, and the amount of resistance to rotation of the pump gears about their axes will determine the ratio of rotation between the driving and driven shafts. Oil is supplied to the pumps at the periphery of the housing and controlled by manually operable gates which regulate flow of the oil from the space between the pumps, thereby varying the amount of oil that must be handled by the pumps, and correspondingly varying the resistance offered to the rotation of the pump gears about their axes.

A further specific object of the present invention is to provide a transmission of the above character, wherein the transmission housing is divided by a partition into a pump chamber and an oil supply chamber, and wherein float valves are provided for controlling the flow of oil from the oil supply chamber to the pump chamber so as to maintain a predetermined quantity of oil in said pump chamber.

A still further object of the present invention is to provide a transmission of the above kind which is comparatively simple, compact and durable in construction, and so constituted as to insure continued efficient operation.

Further objects of the invention will become apparent from the following description when considered in connection with the accompanying drawings, and the invention consists in the novel form, combination and arrangement of parts hereinafter more fully described, shown in the drawings and claims.

In the drawings, wherein like reference characters indicate corresponding parts throughout the several views—

Figure 3 is a vertical longitudinal section taken on line 3—3 of Figure 2.

Figure 4 is a transverse section taken on line 4—4 of Figure 3.

Figure 6 is a transverse section taken on line 6—6 of Figure 3.

Figure 7 is a fragmentary section taken on line 7—7 of Figure 6.

Figure 8 is a perspective view of one of the gates for controlling the flow of oil through the pumps, together with its actuating arm.

Figure 11 is a fragmentary view, partly diagrammatic, illustrating the manner in which the pump gate actuating pedal may be utilized to close the circuit of a solenoid for opening the throttle valve of an engine carburetor so that the engine may be operated with the throttle wide open when the present transmission is in use.

Figure 12 is a fragmentary transverse section taken on line 12—12 of Figure 1.

Figure 15 is a fragmentary side elevational view showing the present transmission employed in the driving apparatus for stationary machinery, and Figure 16 is a section taken substantially on line 16—16 of Figure 15.

Figure 1:
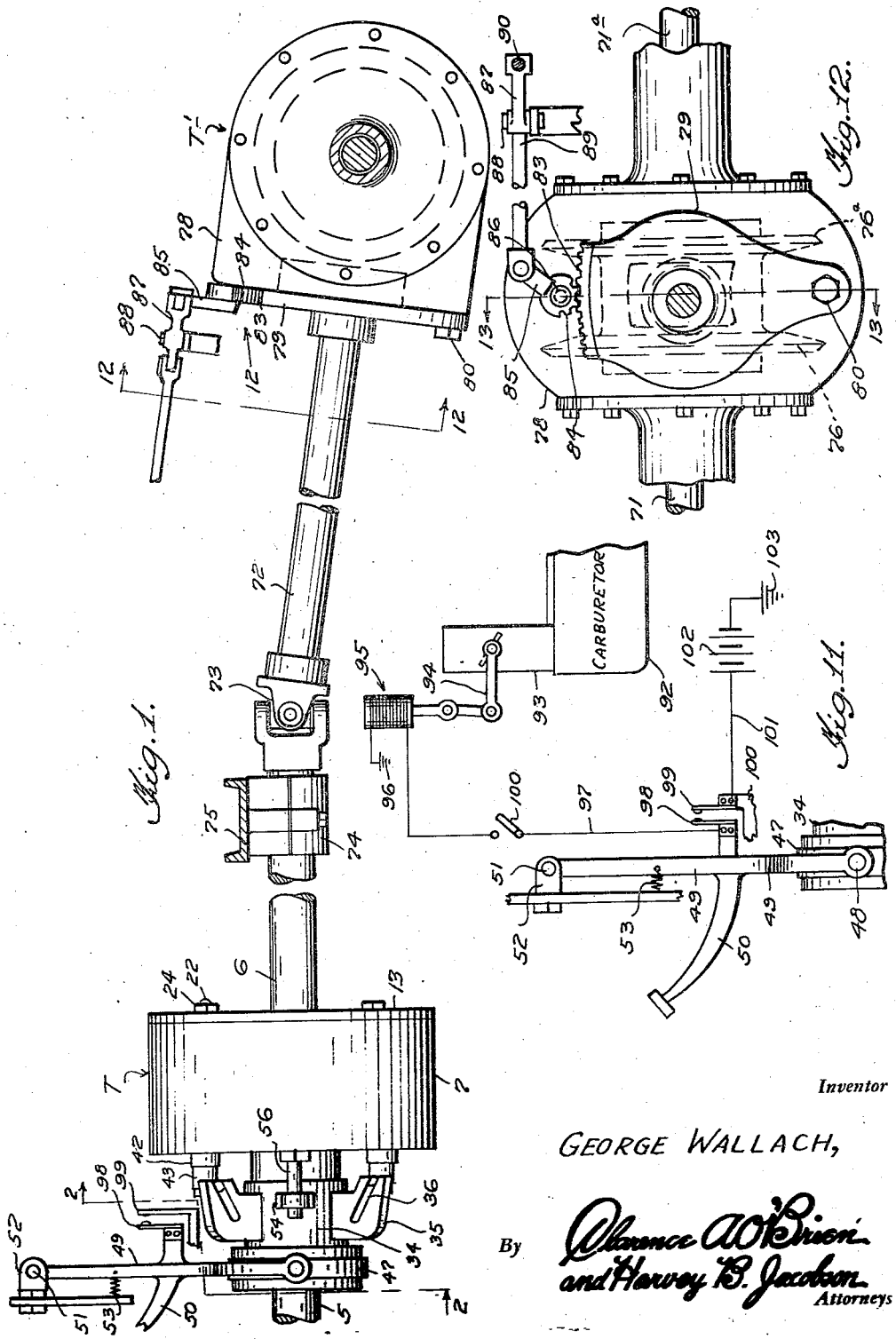
Figure 1 is a fragmentary side elevational view, partly broken away and partly in section, of a driving apparatus for a motor vehicle embodying a transmission and a combined differential and reversing gearing constructed in accordance with the present invention.

Referring in detail to the drawings, 5 indicates the motor or driving shaft and 6 the driven shaft, which shafts are operatively connected by means of a variable speed hydraulic transmission constructed in accordance with the present invention. The transmission includes a cylindrical or circular housing 7 provided at its front end with an axial hub 8 keyed on the rear end of driving shaft 5, as at 9, and provided with a transverse partition 10 that divides the interior of the housing into a front pump chamber 11 and a rear oil supply chamber or reservoir 12. The housing has a rear closure plate 13 formed with an internal cylindrical hub 14 in which is fitted a bearing sleeve 15 that receives the driven shaft 6. The front end of driven shaft 6 projects into the pump chamber 11 and has a driven or sun gear 16 fixed thereon. Gear pumps are provided within the chamber 11 at opposite sides of the housing 7, each gear pump including a pair of intermeshing gears or gear pistons 17 and 18 journaled on enlarged stem portions 19 of stud bolts 20 fixed in the front wall of the housing 7. The gear 18 of each pump is of larger diameter than the gear 17 thereof and meshes with the sun gear 16. The partition 10 is drawn by nuts on bolts 20 snugly against the rear ends of the enlarged bolt portions 19 and also against an internal annular shoulder 21 provided in the housing 7. Bolts 20 are extended through cover plate 13 and have nuts 22 threaded thereon to secure said cover plate in place. Fitted in the space between and at the outer sides of the gears of each pump is a block 25 having faces 26 conforming to the contour of the gears 17 and 18 and lying closely adjacent thereto, outer arcuate surfaces of the blocks 25 contacting and conforming to the inner surface of the housing 7. The blocks are doweled and bolted in place, as indicated at 27 and 28, respectively. A space 29 of appreciable size is thus left within the pump chamber 11 between the pumps, which space is radially divided intermediate the pumps and at opposite sides of the sun gear 16 by means of baffles 30. Thus, the pumps receive the oil at their outer sides or adjacent the periphery of the housing 7 and discharge it in opposite directions into the space 29 adjacent the sun gear 16, as indicated by dotted arrows. The baffles 30 carry rigid threaded studs 23 and 31 on their rear edges which also project through the partition 10 and respectively have nuts 24 and 32 threaded thereon to secure the baffles in place.

As the oil is maintained at a predetermined proper level within the chamber 11 by a means that will be later described, and as the housing 7 rotates with the driving shaft 5, such oil will be evenly distributed by centrifugal force in a layer of considerable thickness at the inner peripheral surface of the housing 7 within the outer portions of the space 29. Swinging gates or gate valves 33 are provided in the chamber 11 at the outer sides of the gears of each pump so as to control the flow of oil to the pumps from the space 29. As shown clearly in Figure 4, the gates 33 are closed by swinging them outwardly so as to contact the peripheral wall of the housing 7 at their outer ends, while the gates 33 are opened by swinging them inwardly toward the adjacent pump gears as shown by dotted lines.

Obviously, if the gates 33 are closed, no oil will be permitted to flow from the space 29 to the pumps, and the pump gears 17 and 18 may rotate freely about their axes 19 so as to revolve with the housing 7 and driving shaft 5 about the sun gear 16 without driving the latter or the driven shaft 6. As the gates 33 are opened, however, oil will be permitted to flow to the pumps so that the latter will build up a pressure between the gears thereof that will act to stall or resist rotation of the pump gears about their own axes 199. Naturally, upon the degree of opening of the gates 33 and the amount of stalling imposed upon the pump gears will depend the ratio of speed between the driving and driven shafts 5 and 6. Slowing the speed of rotation of the pump gears about their axes 19 will cause power to be transmitted from shaft 5 to shaft 6, the ratio of drive being dependent upon the degree to which the pump gears are slowed in rotation about their axes 19. Theoretically, if the pump gears are not permitted to rotate at all on their own axes, the driven shaft will be driven at exactly the same speed as the driving shaft. However, there will be a limited amount of slippage due to the leakage of oil so that the most practical attainment is to succeed in driving the driven shaft at about 95% of the speed of the driving shaft. It is well to point out at this time that the action obtained herein is not similar to that obtained by controlling the output of a pump located within a stationary housing. Instead, the action obtained in this invention is to vary the quantity of oil supplied to and capable of being pumped by the pumps, thereby controlling the amount of pressure that may be built up between the gears of the pump and consequently controlling the degree of stalling of the pump gears or the degree of resistance proper to rotation of the pump gears about their own axes. More particularly, it should be borne in mind that this is had in connection with gear pumps whose gears revolve with a rotary housing keyed on and rotating with the driving shaft.

Figure 2:
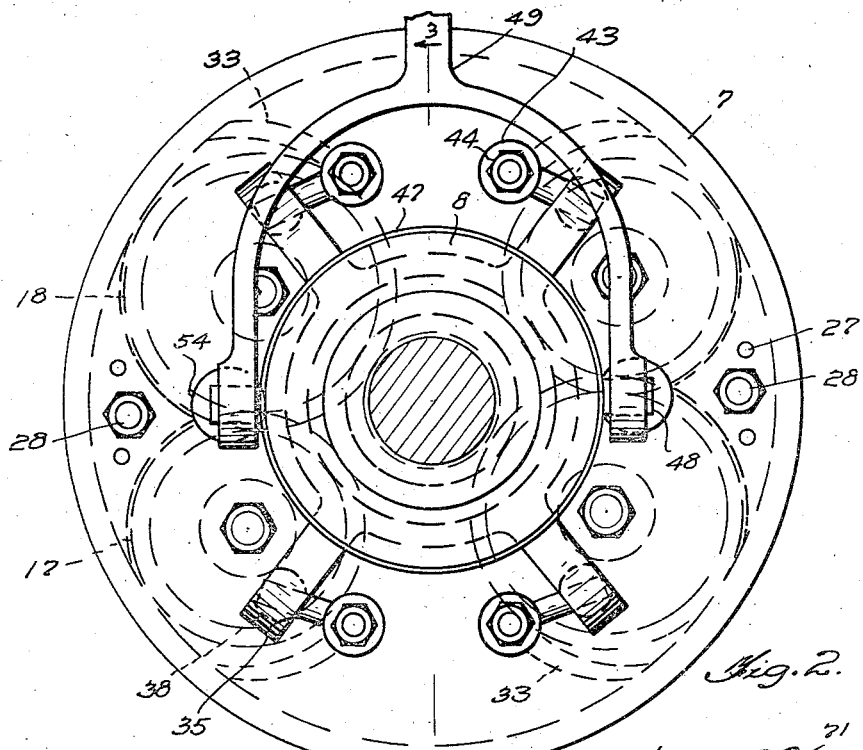
Figure 2 is an enlarged transverse section taken substantially on line 2—2 of Figure 1 and showing the transmission in front elevation.

Secured on and rotatable with the external hub 8 of the housing 7 is the hub 34 of a spider having radial angular arms 35 whose outer ends are directed rearwardly toward the housing 7 and are formed with rearwardly diverging inclined slots 36, the opposed walls of which are grooved as indicated at 37 in Figures 4 and 6. Slidably received in the grooved or undercut slots 36 are ball members 38 provided on corresponding ends of actuating arms 40 secured on and projecting laterally from the forward ends of pintles 41 of the gates 33. The pintles 41 are journaled in bearings 42 of the housing 7, and the arms 40 have hubs 43 fitted on tapered terminal portions of the pintles 41 and secured thereon by cap screws 44 (Figure 2) threaded in axial threaded bores 45 (Figure 8) of the pintles 41. The hub 34 of the spider is provided with a thickened forward end having an annular external groove 46 therein within which is revolubly positioned a shifting ring 47, to opposite sides of which is pivoted at 48 the ends of the arms of a shifting fork 49 carried by a foot pedal 50 and pivoted at its upper end, as at 51, to a suitable fixed bracket 52. The arrangement is such that when the pedal 50 is depressed, shifting fork 49 is swung rearwardly so as to slide the spider rearwardly and cause the arms 40, through the medium of balls 38, to follow the inclination of slots 36. This causes swinging movement of arms 40 toward shaft 5 and swinging of gates 33 to open position. The degree of opening of gates 33, of course, depends upon the distance to which the pedal 50 is depressed, and the parts are returned to normal position by spring 53 acting on lever 49 so as to normally close the gates 33. In order to cause the spider 34, 36 to rotate with the housing 7, said spider is provided at opposite sides with supplemental radial arms 54 having openings 55 in their outer ends which slidably receive guide pins 56 that are fixed to and project forwardly from the front wall of housing 7 directly inwardly of the bolts 28. The grooves 37 are of segmento-spherical form in cross section so as to permit the ball members 39 to turn therein and thereby allow the arms 40 to assume different angular positions to which they are moved by the shifting of the spider toward and from the housing 7.

Figure 5:
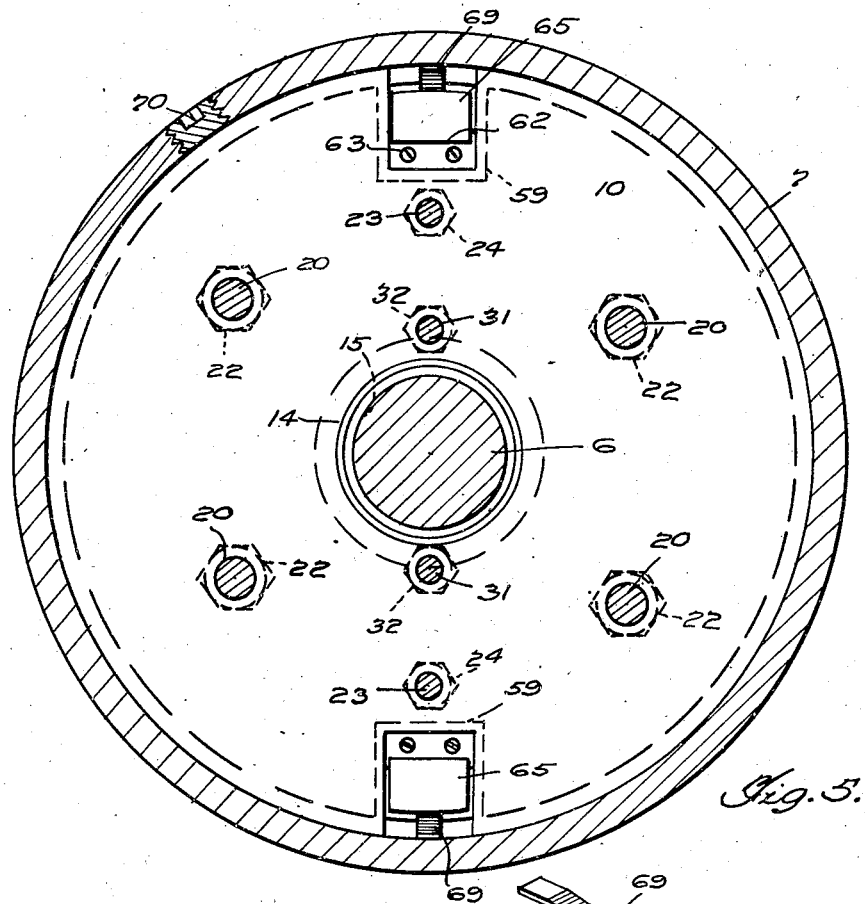
Figure 5 is a transverse section taken on line 5—5 of Figure 3.
Figures 9, 10:
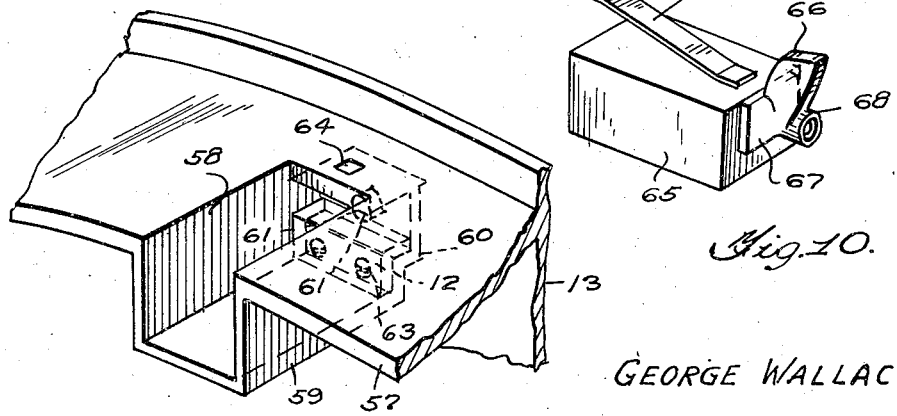
Figure 9 is a fragmentary perspective view showing a portion of the rear cover plate of the transmission housing, and illustrating the manner in which said cover plate is provided with float chambers.
Figure 10 is an enlarged perspective view of one of the float valves.

As shown clearly in Figures 3, 5, and 9, the cover plate 13 is formed with an inwardly projecting annular flange 57 that is cut away at diametrically opposite points, as at 58, and that is formed at these points with inwardly projecting, channel-shaped float chambers 59 provided with rear walls 60 spaced from the adjacent closure plate 13 and provided with inlet openings 61. An L-shaped bracket 62 is secured to the inner, offset portion of wall 60 by screws 63, or the like, and directly opposite this L-shaped bracket 62 the flange 57 is formed with an opening 64. Loosely arranged in each float chamber is a rectangular float 65 having a fulcrum lug 66 at its rear end engaged loosely in the adjacent opening 64 and carried by a bracket 67 fixed to the adjacent end of the float. The bracket 67 also carries a valve plug 68 arranged to seat against the wall 60 about the opening 61 to normally close the latter. The float 60 is yieldingly tilted about the fulcrum lug 66 inwardly by means of a relatively weak leaf spring 69 attached to the outer wall of the float at its rear end and bearing, at its forward end, against the peripheral wall of the housing 7 at the forward part of the float chamber. The oil supply chamber 12 may be filled with oil through a suitable filler opening provided in the peripheral wall of housing 7 and normally closed by a removable screw plug 70 (Figure 5). The arrangement is such that when the housing 7 is rotated, the oil will assume a layer adjacent the inner peripheral surface of the housing 7. At the start of the operation, the floats are moved outward by centrifugal force, and by so doing, the valve plugs 68 uncover the openings 61, permitting oil to flow from the supply chamber 12 to the pump chamber 11. As soon as the quantity of oil in the pump chamber reaches the desired mark, the front ends of the floats move inwardly so as to cause the plugs 68 to close openings 61. In this way, the quantity of oil in the pump chamber is maintained constant. Leaf springs 69 insure against flooding the pump chamber when the transmission is not in operation.

In Figure 1, I have shown a driving apparatus of the kind employed in transmitting power from an internal combustion engine to the rear axle sections of a motor vehicle, such apparatus utilizing a variable speed transmission T constructed in accordance with the present invention and also a combined differential and reverse gearing T' which is also constructed in accordance with the present invention, the gearing T' serving to transmit power to the transverse aligned rear axle sections 71 and 71a of the vehicle from a longitudinal propeller shaft 72 that is coupled by a universal joint 73 with the driven shaft 6 of the transmission T. The shaft 6 is shown as supported by a suitable bearing 74 mounted on the underside of a transverse frame member 75 of the vehicle chassis.

Figures 13, 14:
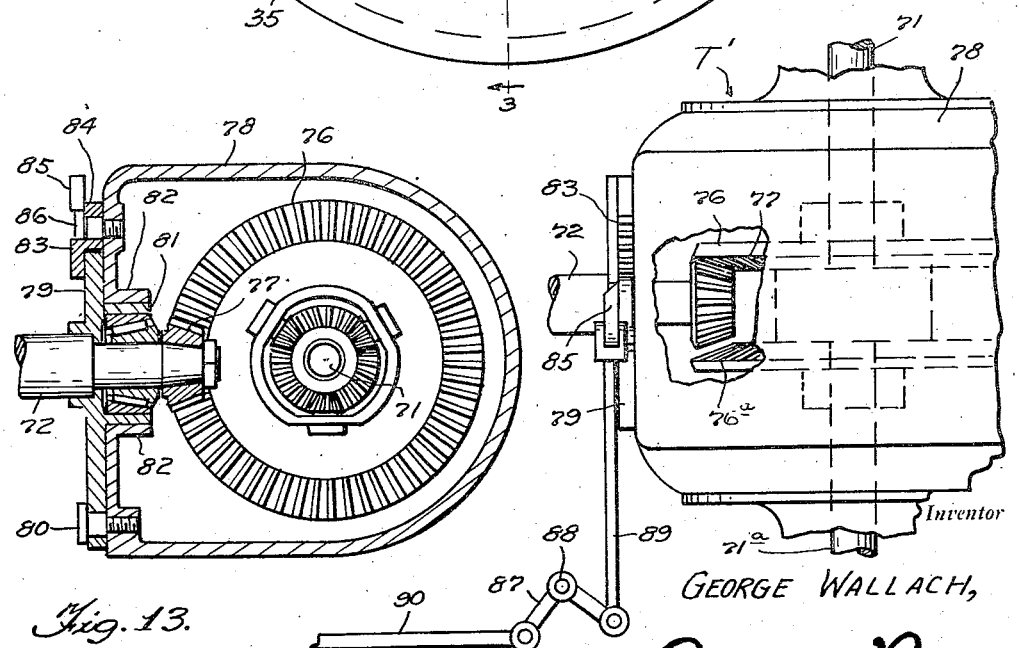
Figure 13 is a longitudinal section taken on line 13—13 of Figure 12.
Figure 14 is a top plan view of the construction shown in Figure 12.

As shown in Figures 1 and 12 to 14, inclusive, the gearing T' is of conventional type and construction except that the spider for the spider gears of the differential carries a second beveled ring gear 76 in addition to the conventional beveled ring gear 76a, the ring gear 76 facing the ring gear 76a and disposed at the opposite side of the drive pinion 77 of propeller shaft 72 from that at which the ordinary ring gear 76a is disposed. Thus, when the pinion 77 is engaged with ring gear 76a, the rear axle sections 71 and 71a will be differentially driven in one direction, while, if the pinion 77 is engaged with the ring gear 76, said rear axle sections 71 and 71a will be driven in a reverse direction. In order to permit selective engagement of driving pinion 77 with either desired one of the ring gears 76 and 76a, the latter gears are spaced apart a distance slightly greater than the diameter of pinion 77, and propeller shaft 72 is mounted for limited lateral movement at its rear end with respect to the housing of gearing T'. Thus, the shaft 72 extends through an opening in the front of housing 78 that is elongated horizontally for a sufficient distance to permit the necessary lateral movement of shaft 72 to effect the selective engagement of pinion 77 with either desired one of the ring gears 76 and 76a. Means is provided for laterally swinging the shaft 72 to effect this operation, which means includes a plate pivoted at its lower end, as at 80, to the front wall of housing 78 for lateral swinging movement in the general plane of the front wall of housing 78 so as to maintain constant contact with said front wall. Thus, by the provision of suitable packing between the contiguous faces of the housing 78 and plate 79, leakage of oil from the housing 78 may be prevented at the opening where the shaft 72 projects into said housing 78. Shaft 72 is journaled in a bearing at 80 carried by the plate 81 and movable between flanges 82 on the front wall of housing 78, as shown in Figure 13. At its upper edge, the plate 79 is provided with a rack 83, and meshing with the teeth of this rack is a mutilated spur pinion 84 provided on one end of a lever 85 and pivoted at 86 to the front wall of housing 78. A bell crank lever 87 is pivoted at 88 to the vehicle frame at one side of the shaft 72, and one arm of this bell crank lever is connected by a rod 89 with the lever 85. The other arm of lever 87 may be connected by a rod 90 with a hand lever within convenient reach of the driver of the motor vehicle. The arrangement is such that when the rod 90 is pulled forwardly mutilated pinion 84 is turned to swing plate 79 in a direction to cause drive pinion 77 to engage ring gear 76. On the other hand, when the rod 90 is moved rearwardly, the lever 85 is swung in a direction to move drive pinion 77 into mesh with ring gear 76a, thereby causing the rear axle sections 71 and 71a to be driven in a reverse direction. It will be apparent that by this slight and practical modification of a conventional differential gearing, the necessity for incorporating reversing mechanism in the variable speed transmission T is eliminated. This results in the production of a variable speed transmission of the hydraulic type which is of simplified form and only required to provide different speeds of forward travel of the vehicle. When a motor vehicle is equipped with a variable speed transmission constructed in accordance with the present invention, it is desirable to permit the internal combustion engine, which forms the power plant of the vehicle, to operate with the throttle valve 91 of the engine carburetor 92 in fully open position whenever the transmission is brought into operation by opening movement of gates 33. The throttle valve 91, of course, controls the admission of air through the air intake 93 of the carburetor 92, and it has an operating lever 94 which is connected in accordance with the present invention with the core of a solenoid 95. One side of the coil of solenoid 95 is shown grounded as 96, while the other side thereof is connected by a wire 97 with a contact 98 of a circuit maker and breaker. The contact 98 is carried by the shifting lever or fork 49, and is opposed to another contact 99 fixed to a stationary bracket 100. The arrangement is such that when the pedal 50 is depressed, the contact 98 will be engaged with contact 99 so as to close the circuit of the solenoid 95 and thereby cause the latter to fully open the throttle valve 91 when the gates 33 of the transmission T are swung toward open position. As shown, a manually operable switch 100 may be interposed in the wire 97 for rendering the solenoid 95 operative or inoperative at will, depending upon whether or not its use is desired. Also, the contact 99 is connected by a wire 101 to one side of a battery 102, whose other side is grounded at 103. The circuit of the solenoid 95 will be readily traced from this description.

In Figures 15 and 16, I have shown the present variable speed transmission T incorporated in the drive for stationary machinery. In this sort of installation, the driving motor may consist of an electric motor 104 having the housing 7 of the transmission secured on the armature shaft thereof. Also, the driven shaft 6 may be equipped with a suitable coupling element 105, by means of which said driven shaft may be coupled to the shaft of the machinery which is to be driven. In this sort of installation, the shifting fork 49a is extended downwardly from the drive shaft and has its lower end mounted for rocking movement in a socket 106 of the motor base 107. A transverse horizontal shaft 108 is journaled in a bracket 109 rigidly mounted on the base 107, and this shaft 108 carries an eccentric 110 rotatable in an eccentric strap portion 111 of the shifting fork 49a. At one end, shaft 108 is equipped with a hand wheel 112 to facilitate manual turning thereof. Thus, by turning shaft 108, eccentric 110 may be turned to shift the fork 49a and thereby operate the spider 34, 35 for opening or closing the gates 33 of the transmission. Otherwise, the transmission of this embodiment is constructed exactly the same as that already described in connection with Figures 1 to 10, inclusive.

In operation, the transmission housing 7 rotates with the drive shaft 5 so that the oil in the pump chamber 11 is thrown outwardly and distributed in a uniform layer at the periphery of the transmission housing within the space between the pumps. With the transmission housing rotating, and the driven gear 16 stationary, the planetary gears 18 are caused to rotate, and they, in turn, rotate the cooperating pump gears 17 in a manner to pump oil inwardly toward the center of the transmission housing. As no outlet is provided for oil thus pumped, except through tolerances in mesh between each pair of pumping gears, an oil pressure is built up, which oil pressure acts on the pump gears to restrain them from rotating on their respective axes. This lends driving ability to the gears 18 instead of just idling around the driven gear 16. Thus, if resistance is offered to rotation of the driving gears 18 by the oil pressure, and if such resistance should equal the torque on the driving gears produced by the resistance of the driven gear to rotation, a one to one ratio between driving and driven gears would be the result. If, however, the resistance to rotation of the driven gear increases, the driving gears will rotate on their own axes and at the same time will move around the driven gear to a variable extent, thus increasing the ratio between the driving and driven gears. The increased speed of rotation of the driving gears on their own axes will result in oil being pumped at a higher rate, thus tending to maintain the necessary oil pressure to overcome the high resistance offered by the driven gear. When the higher oil pressure is not demanded, the reverse action takes place. In order to drive the sun gear 16 on the driven shaft 6, the fork 49 is moved to open the gates 33 to the desired extent, permitting the accumulated oil between the pumps to flow to the latter. Pressure is then built up between the gears of the pumps, the oil being discharged in a high pressure, jet-like stream from between the pump gears adjacent the driven gear. When the pump gears receive a larger volume of oil than is discharged by them, an oil pressure between the pump gears is soon built up, causing them to stall to a varied extent on their respective axes. The extent of opening of gates 33 determines the amount of oil flow to the pump gears. On the amount of oil flow to the pump gears, the rapidity of oil discharge by the pumps and the resistance of the gear being driven, depends the degree of oil pressure built up between the pump gears. Upon the degree of oil pressure built up between the pump gears, depends the amount of stalling of the driving gears and the ratio between the driving and driven gears. It will thus be seen that by properly adjusting the gates 33, the flow of oil to the pumps may be regulated to effect the driving of driven shaft 6 at the desired ratio of speed relative to the speed of the driving shaft 5. With any given adjustment of the gates 33, the speed of rotation of driven shaft 6 will automatically increase as resistance to its rotation is overcome or reduced.

From the foregoing description, it is believed that the construction and operation, as well as the advantages of the present invention will be readily understood and appreciated by those skilled in the art. While preferred embodiments of the invention have been illustrated and described in considerable detail, it will be apparent that the invention is susceptible of modification and changes in details of construction such as fall within the spirit and scope of the invention as claimed. With the arrangement shown in Figure 11, the inertia of an idling engine can be used while driving on a down grade for braking purposes, the oil flowing to the pump gears transmitting momentum of the vehicle to the slow-running engine so that only limited use of brakes is necessary. When the pedal 50 is not depressed, the arrangement results in free-wheeling. Also, by controlling the flow of oil to the gear pumps, the transmission functions as a clutch as well as to change speed. As a whole, the transmission also acts as a fly wheel.

What I claim is:

1. In a driving apparatus, a variable speed planetary type hydraulic transmission comprising, in combination with aligned driving and driven shafts, a housing having a pump chamber, means to secure said housing on the driving shaft for rotation with the latter, gear pumps arranged in said pump chamber at opposite sides of the housing and spaced apart to provide an oil space therebetween, each gear pump including intermeshing gears journaled for rotation relative to the housing upon axes parallel with the driving and driven shafts, a sun gear secured on the driven shaft and meshing with one gear of each pump, and swinging valve gates for controlling the flow of oil from said oil space to the respective pumps between both gears of each pump and the periphery of the housing, and manually operable means for operating said gates to regulate the opening or closing thereof.

2. In a driving apparatus, a variable speed planetary type hydraulic transmission comprising, in combination with aligned driving and driven shafts, a housing having a pump chamber, means to secure said housing on the driving shaft for rotation with the latter, gear pumps in said pump chamber at opposite sides of the housing, each gear pump including intermeshing gears journaled for rotation relative to the housing upon axes parallel with the driving and driven shafts, a sun gear secured on the driven shaft and meshing with one gear of each pump, and swinging valve gates for controlling the flow of oil to the respective pumps at the periphery of the housing, a filler block on the periphery of the casing and extending inwardly between the outer portions of the gears of each pump, said pumps being spaced apart to provide an oil space between them, the gears of said pumps and the filler blocks being disposed to admit oil from said oil space to each pump with the oil flowing between the outer sides of both gears of each pump and the periphery of the housing in the direction of rotation of the pump gears.

3. The construction defined in claim 2, in combination with manually operable means for operating said gates to regulate the opening or closing thereof, said last-named means comprising rock shafts carrying said gates and projecting forwardly through the housing, laterally extending arms on the rock shafts, a spider longitudinally slidable on the driving shaft and having angular arms provided with rearwardly extending outer end portions, said rearwardly extending outer end portions being provided with forwardly converging, inclined slots receiving the free ends of said arms whereby rearward movement of the spider effects swinging of said arms in one direction to effect opening of said gates and forward movement thereof effects swinging of the arms in the opposite direction to effect closing of said gates.

4. In a driving apparatus, a variable speed planetary type hydraulic transmission comprising, in combination with aligned driving and driven shafts, a housing having a pump chamber, means to secure said housing on the driving shaft for rotation with the latter, gear pumps in said pump chamber at opposite sides of the housing, each gear pump including intermeshing gears journaled for rotation relative to the housing upon axes parallel with the driving and driven shafts, a sun gear secured on the driven shaft and meshing with one gear of each pump, and valve gates for controlling the flow of oil to the respective pumps at the periphery of the housing, said housing further having an oil supply chamber, and float means for automatically controlling admission of oil to the pump chamber from said supply chamber so as to maintain oil at a predetermined level in said pump chamber.

5. The construction defined in claim 1, in combination with radial baffles in said oil space between the pumps and at opposite sides of the driven shaft.

6. In a driving apparatus, a variable speed planetary type hydraulic transmission comprising, in combination with aligned driving and driven shafts, a housing, a transverse partition dividing the housing into a pump chamber and a supply chamber, said partition having openings therein adjacent the periphery of the housing, means to secure said housing on the driving shaft for rotation with the latter, gear pumps in said pump chamber at opposite sides of the housing, each gear pump including intermeshing gears journaled for rotation relative to the housing upon axes parallel with the driving and driven shafts, a sun gear secured on the driven shaft and meshing with one gear of each pump, valve gates for controlling the flow of oil to the respective pumps at the periphery of the housing, float chambers in the supply chamber and communicating with the openings in the partition, and centrifugally-opened spring-closed float valves in said float chambers for automatically controlling passage of oil from the supply chamber to the float chambers so as to maintain oil at a predetermined level in said pump chamber.

GEORGE WALLACH.